United States Patent
Bösl

(10) Patent No.: US 6,779,391 B2
(45) Date of Patent: Aug. 24, 2004

(54) DEVICE FOR MEASURING THE UNIFORMITY OF A VEHICLE TIRE

(75) Inventor: Roland Bösl, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1 day.

(21) Appl. No.: 10/257,905

(22) PCT Filed: Apr. 14, 2001

(86) PCT No.: PCT/EP01/04273

§ 371 (c)(1),
(2), (4) Date: Oct. 16, 2002

(87) PCT Pub. No.: WO01/81887

PCT Pub. Date: Nov. 1, 2001

(65) Prior Publication Data

US 2003/0150260 A1 Aug. 14, 2003

(30) Foreign Application Priority Data

Apr. 20, 2000 (DE) .......................... 100 19 565

(51) Int. Cl.⁷ .......................................... G01M 17/02
(52) U.S. Cl. ........................................................ 73/146
(58) Field of Search ........................ 73/146, 146.2, 73/146.3, 146.5, 146.8

(56) References Cited

U.S. PATENT DOCUMENTS

| | | | |
|---|---|---|---|
| 3,552,200 A | 1/1971 | Hermanns et al. ............ | 73/146 |
| 3,948,095 A | 4/1976 | Burgett et al. ................ | 73/146 |
| 5,107,703 A | 4/1992 | Ota .............................. | 73/146 |
| 5,317,912 A | 6/1994 | Mallison ...................... | 73/146 |
| 5,323,646 A | 6/1994 | Poling, Sr. .................... | 73/146 |
| 5,773,717 A | 6/1998 | Reinhardt et al. ............ | 73/146 |
| 6,016,695 A * | 1/2000 | Reynolds et al. ............. | 73/146 |
| 6,435,027 B1 * | 8/2002 | Colarelli et al. .............. | 73/462 |
| 6,513,372 B2 * | 2/2003 | Anno et al. ................... | 73/146 |
| 6,658,936 B2 * | 12/2003 | Matsumoto ................... | 73/460 |

FOREIGN PATENT DOCUMENTS

| | | | | |
|---|---|---|---|---|
| DE | 31 11 866 A1 | 10/1982 | .......... | G01M/17/02 |
| DE | 39 05 475 C2 | 9/1994 | .......... | G01M/17/02 |
| EP | 0 080 127 A2 | 6/1983 | .......... | G01M/17/02 |
| EP | 0 305 613 A1 | 8/1989 | .......... | G01M/17/02 |
| EP | 0 671 621 A2 | 9/1995 | .......... | G01M/17/02 |
| EP | 0 897 107 A2 | 2/1999 | .......... | G01M/17/02 |
| WO | 88/09923 | 12/1988 | .......... | G01M/17/02 |
| WO | 97/28431 | 8/1997 | ............ | G01M/1/00 |

* cited by examiner

*Primary Examiner*—Edward Lefkowitz
*Assistant Examiner*—Andre Alen
(74) *Attorney, Agent, or Firm*—Davis & Bujold, P.L.L.C.

(57) ABSTRACT

A device for measuring uniformity of a vehicle tire, in which a roller (5) drives a vehicle tire (1) mounted in a machine frame (4) via a piezo measuring hub (3). The roller is mounted via radial bearings (9) on a sliding carriage (10) that can be displaced, and is supported in the axial direction exclusively by force-measuring cells (11).

15 Claims, 1 Drawing Sheet

DEVICE FOR MEASURING THE UNIFORMITY OF A VEHICLE TIRE

Figure 1:
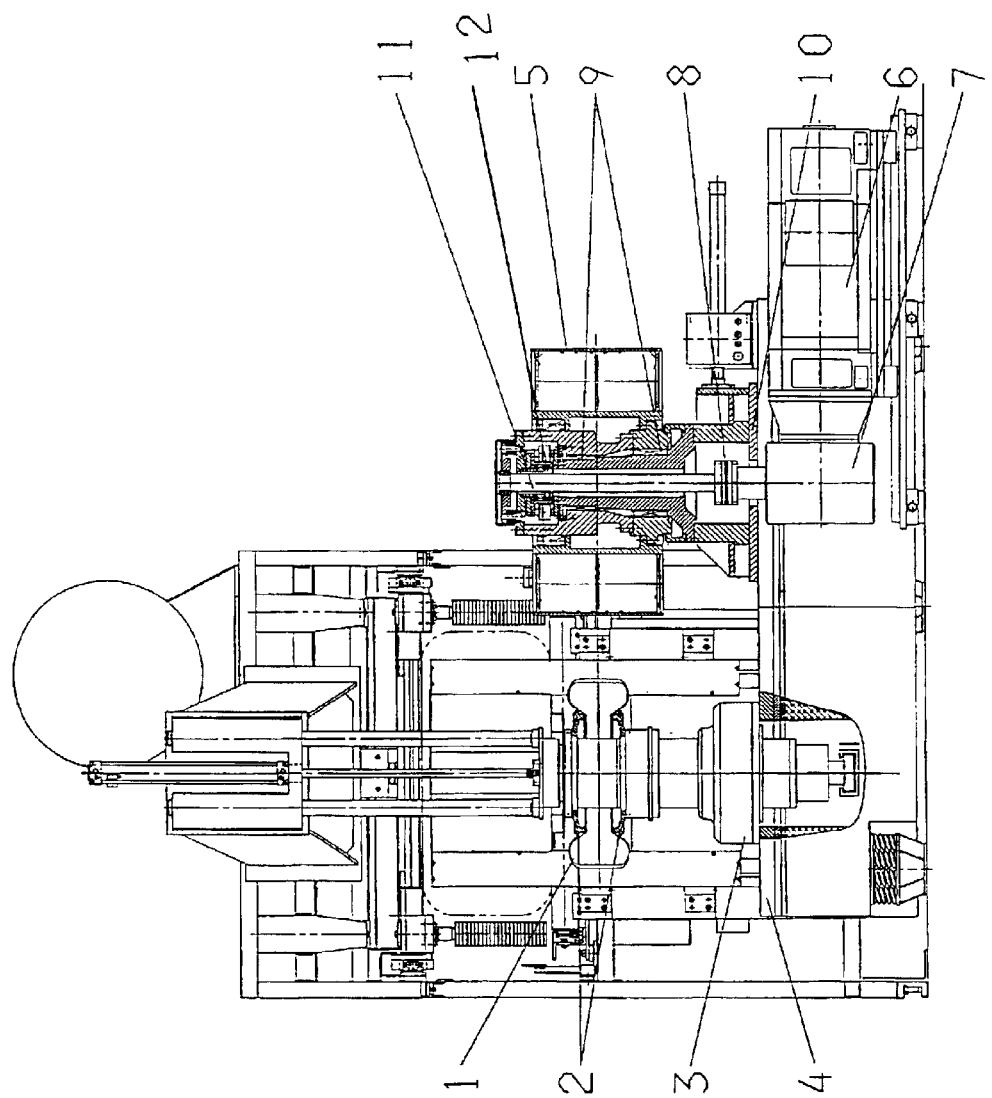

The invention relates to a device for measuring the uniformity of a vehicle tire, of the type defined more closely in the pre-characterising portion of claim 1. The running smoothness of a vehicle and the wear of various vehicle components depend on the uniformity on otherwise of the vehicle's tires. Force fluctuations produced by the tires during driving also influence the running smoothness of the vehicle. To be able to assess the quality of the vehicle tires, tires of the most varied sizes, with and without loading of the tire, are subjected to low and very high speeds.

EP 0 897 107 A2 discloses a device for measuring the uniformity of a vehicle tire, in which a roller can be displaced on a frame in such manner that a vehicle tire fixed and driven in a test rig comes into contact with the said roller. The roller is fixed in a sliding carriage by means of pressure bearings constructed as roller bearings. The vehicle tire is held in a measurement device for measuring reaction forces, the measuring device illustrated in FIG. 5 having at least three measuring transducers formed as two-component force-measuring elements operating on a piezo basis. With this type of force-measuring element, force variations in the radial, lateral and tangential area can be determined. An exact measurement of the static lateral forces cannot be carried out with the device for measuring the uniformity of a vehicle tire disclosed in FIG. 5. The solutions illustrated in FIGS. 1 to 4 are unsuitable for high-speed measurements on account of insufficient rigidity.

The purpose of the present invention is to provide a device for measuring the uniformity of a vehicle tire, with which all the forces acting on the wheel hub can be determined even when the tire is rotating at high speed.

This objective is solved with a device for measuring the uniformity of a vehicle tire, which is of the type described but also embodies the characterizing features of the main claim.

According to the invention a vehicle tire to be tested, or even a complete wheel, is positioned in a holding device which is mounted via differential force sensors. The holding device for the vehicle tire preferably consists of a divided measuring wheel-rim system, which can also be provided with an automatic chuck width adjustment in order to enable rational testing of vehicle tires during production. The differential force sensors are preferably arranged in a multi-component piezo measuring hub which is attached rigidly to the machine frame and which accommodates the holding device for the vehicle tire. A driven roller is mounted to rotate on a sliding carriage arranged on a frame upon which it can be displaced. The roller and the vehicle tire to be tested are positioned horizontally, thanks to which, with a divided measuring wheel-rim system, simple transport to and from the device for measuring the uniformity of a vehicle tire is made possible. The roller can be driven by a drive motor whose speed is adjustable. By moving the sliding carriage with the roller against the vehicle tire to be tested, a defined wheel load can be established. In the radial direction the roller is mounted on radial bearings, preferably hydraulic bearings of a hydrostatic or a hydrodynamic design. Thanks to the use of such bearings, the roller can be displaced in the axial direction. The roller is axially supported exclusively by a de-coupled axial bearing, itself supported in force-measuring cells. The drive motor of the roller can also be de-coupled from the roller by couplings that are 'soft' in the axial direction, so[]that the lateral forces of the vehicle tire can be picked up by the force-measuring cells virtually without friction and without excessively high measurement peaks. The diameter of the roller is preferably similar to those in tire test rigs operating at a speed of about 60 rpm. This small roller diameter enables the acceleration phase for testing the vehicle tire at high speeds to be kept short. Since once the roller has accelerated, the vehicle tire it is withdrawn from the tire, out-of-balance forces of the freely rotating wheel can also be determined. Thus, all the forces and torques acting on the wheel hub, i.e., all the forces and torques that result from imbalance, rigidity fluctuations, out-of-round defects or mass defects, can be determined. Thanks to the separate measurement of the static lateral force, cone and angle effects too can be measured with high accuracy. The device for measuring the uniformity of a vehicle tire can also be fitted with measuring devices for measuring the geometry of the vehicle tire, such as the concentricity and planarity of its running.

Other characteristics emerge from the figure and the description thereof.

The single figure shows a device for measuring the uniformity of a vehicle tire, in which a vehicle tire 1 is held in a divided measuring wheel-rim system consisting of two measuring half-rims 2. The measuring wheel-rim system can be equipped with an automatic chuck width adjustment, to enable testing of vehicle tires of different sizes without having to refit the measuring wheel-rim system. Via the measuring wheel-rim halves 2, the vehicle tire 1 is mounted on a multi-component piezo measuring hub 3. The multi-component piezo measuring hub 3 is mounted on a machine frame 4. The piezo measuring hub 3 preferably comprises four piezo measuring elements, each of which measures in three force directions. A roller 5 is driven by an adjustable-speed drive motor 6 via a conical drive 7 and a coupling 8 designed to have a damping effect in the axial direction. The roller is mounted via two radial bearings 9 on a sliding carriage 10 arranged and able to move on the machine frame 4. In the axial direction the roller 5 is mounted via force-measuring cells 11 on an axial bearing 12. The force-measuring cells 11 can consist of a DMS capsule. Thanks to the use of a piezo measuring hub 3 in association with the vehicle tire and that of a roller mounted via a radial bearing 9 and supported in the axial direction via force-measuring cells 11, all the forces acting on the wheel hub can be measured even up to tire speeds in the range of the maximum speed for the tire.

Reference Numerals
1 Vehicle tire
2 Measuring wheel-rim halves
3 Piezo measuring hub
4 Machine frame
5 Roller
6 Drive motor
7 Bevel gear
8 Coupling
9 Radial bearing
10 Sliding carriage
11 Force-measuring cell
12 Axial bearing

What is claimed is:

1. A device for measuring uniformity of a vehicle tire (1) comprising:
   a roller (5) mounted such that the roller (5) can be driven and rotated via bearings (9), the roller being able to be brought into contact with the vehicle tire (1) by linear displacement on a frame (4), the vehicle tire (1) being held in a holding device (2) which is mounted via differential force sensors (3), wherein the roller (5) is mounted in a radial direction, via radial bearings (9), and in an axial direction, via de-coupled axial bearings supported by force-measuring cells (11) and the measurements by the axial force measuring cells are separate and independent of the measurements by the differential measuring sensors of the measuring hub.

2. The device for measuring the uniformity of a vehicle tire according to claim 1, wherein the vehicle tire (1) is held by a divided measuring wheel-rim system (2).

3. The device for measuring the uniformity of a vehicle tire according to claim 1, wherein the differential force sensors (3) are multi-component piezo force sensors.

4. The device for measuring the uniformity of a vehicle tire according to claim 1, wherein the radial bearings (9) of the roller (5) are hydraulic bearings.

5. The device for measuring the uniformity of a vehicle tire according to claim 1, wherein a motor drive (6) is connected to the roller (5) through an axially damping coupling (8) which dampen roller oscillations occurring 4 in an axial direction.

6. A device for measuring uniformity of a vehicle tire (1) comprising:
a holding device (2) for holding the vehicle tire (1), the holding device (3) being mounted via differential force sensors (3);
a roller (5) mounted such that the roller (5) rotates on radial bearings (9) about an axis, the roller being supported along the axis by force measuring cells (11) via de-coupled axial bearings, the force measuring cells (11) measure axial forces acting on the roller (5); and
a frame (4) for supporting the roller (5), the roller (5) being able to be brought into contact with the vehicle tire (1) by displacement on the frame (4) normal to the axis. The measurements by the axial force measuring cells are separate and independent of the measurements by the differential measuring sensors of the measuring hub.

7. The device for measuring the uniformity of a vehicle fire according to claim 6, wherein the vehicle tire (1) is held by a divided measuring wheel-rim system (2).

8. The device for measuring the uniformity of a vehicle tire according to claim 6, wherein the differential force sensors (3) are multi-component piezo force sensors.

9. The device for measuring the uniformity of a vehicle tire according to claim 6, wherein the radial bearings (9) of the roller (5) are hydraulic bearings.

10. The device for measuring the uniformity of a vehicle tire according to claim 6, wherein a drive (6) is connected to he roller (5) through a damping coupling (8) which dampens axial oscillations of the roller.

11. A device for measuring the uniformity of a vehicle tire, comprising:
a tire holding mechanism supporting a tire for rotation about a tire axis,
a measuring hub mounted to a fixed frame and supporting the tire holding mechanism, wherein
the measuring hub includes a plurality of differential measuring sensors for measuring fire forces along a plurality of axes due to rotation of the tire,
a rotatingly driven roller mounted on a roller axis parallel with the tire axis wherein
the roller is supported by a sliding carriage moveable perpendicular to the tire and roller axes of rotation to Bring the rotating roller into contact with the tire to drive the rotation of the tire, and includes
axial force measuring cells mounted on an axial bearing to measure axial forces acting on the roller due to rotation of the tire, wherein
the measurements by the axial force measuring cells are separate and independent of the measurements by the differential measuring sensors of the measuring hub.

12. The device for measuring the uniformity of a vehicle tire according to claim 11, wherein the vehicle tire (1) is held by a divided measuring wheel-rim system (2).

13. The device for measuring the uniformity of a vehicle tire according to claim 11, wherein the differential force sensors (3) are multi-component piezo force sensors.

14. The device for measuring the uniformity of a vehicle tire according to claim 11, wherein the radial bearings (9) of the roller (5) are hydraulic bearings.

15. The device for measuring the uniformity of a vehicle tire according to claim 11, wherein a drive (6) is connected to the roller (5) through a damping coupling (8) which dampens axial oscillations of the roller.

* * * * *